US008611748B2

(12) United States Patent
Yoshimi et al.

(10) Patent No.: US 8,611,748 B2
(45) Date of Patent: Dec. 17, 2013

(54) WDM OPTICAL TRANSMISSION SYSTEM AND WAVELENGTH DISPERSION COMPENSATION METHOD

(75) Inventors: Makoto Yoshimi, Fukuoka (JP); Yoshiyuki Maeda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/429,999

(22) Filed: Mar. 26, 2012

(65) Prior Publication Data

US 2012/0288276 A1 Nov. 15, 2012

(30) Foreign Application Priority Data

May 12, 2011 (JP) ................................. 2011-107066

(51) Int. Cl.
*H04J 14/02* (2006.01)

(52) U.S. Cl.
USPC ............... 398/81; 398/79; 398/147; 398/159; 398/1

(58) Field of Classification Search
USPC ......... 398/79, 81, 90, 93, 147, 148, 149, 158, 398/159, 162, 1, 2, 10, 17, 27, 29
See application file for complete search history.

(56) References Cited

U.S. PATENT DOCUMENTS

| | | | | |
|---|---|---|---|---|
| 7,107,821 B2 * | 9/2006 | Bohm et al. | ................ | 73/40.7 |
| 7,302,192 B2 * | 11/2007 | Elahmadi et al. | ............ | 398/190 |
| 7,436,291 B2 * | 10/2008 | Sellars et al. | ................ | 340/500 |
| 7,457,542 B2 * | 11/2008 | Sekine et al. | ................ | 398/72 |
| 7,580,637 B2 * | 8/2009 | El-Ahmadi et al. | ........ | 398/135 |
| 7,676,158 B2 * | 3/2010 | Ghiasi | ......................... | 398/147 |
| 7,822,052 B2 * | 10/2010 | Yoshii et al. | ................ | 370/412 |
| 7,991,286 B2 * | 8/2011 | Maeda et al. | ................ | 398/4 |
| 8,005,357 B2 * | 8/2011 | Maeda et al. | ................ | 398/5 |
| 8,233,798 B2 * | 7/2012 | Levinson | ...................... | 398/68 |
| 8,249,455 B2 * | 8/2012 | Kazawa et al. | ............... | 398/72 |
| 8,301,035 B2 * | 10/2012 | Harada et al. | ................ | 398/195 |
| 8,331,784 B2 * | 12/2012 | Mizutani et al. | .............. | 398/70 |
| 8,346,077 B1 * | 1/2013 | Uhlhorn et al. | ................ | 398/1 |
| 8,457,495 B2 * | 6/2013 | Mizutani et al. | .............. | 398/70 |
| 8,488,965 B2 * | 7/2013 | Mizutani et al. | .............. | 398/66 |
| 2005/0089027 A1 * | 4/2005 | Colton | ........................ | 370/380 |
| 2007/0071447 A1 * | 3/2007 | Ozaki et al. | ................... | 398/147 |
| 2008/0226304 A1 * | 9/2008 | Maeda et al. | ................ | 398/182 |

(Continued)

FOREIGN PATENT DOCUMENTS

| | | |
|---|---|---|
| JP | 2007-259281 | 10/2007 |
| JP | 2008-236480 | 10/2008 |
| JP | 2010-141683 | 6/2010 |

*Primary Examiner* — Daniel Washburn
*Assistant Examiner* — Hibret Woldekidan
(74) *Attorney, Agent, or Firm* — Staas & Halsey LLP (57) ABSTRACT

A WDM optical transmission system includes a plurality of optical transmission devices, each of which include a first memory that stores a first control program that controls a dispersion compensation amount in a host device; a processor to execute the first control program; a notification frame transmission circuit that transmits an information indicating a setting value of the dispersion compensation amount and a detection result corresponding to the setting value to another device; a third memory that stores a second control program that calculates a control value of the dispersion compensation amount in the another device; and a control frame transmission circuit that transmits the control value to the another device, wherein the processor executes the second control program when a problem occurs in the another device, and controls the dispersion compensation amount in the host device when a problem occurs in the host device.

13 Claims, 9 Drawing Sheets

(56) References Cited

U.S. PATENT DOCUMENTS

| | | | |
|---|---|---|---|
| 2009/0162065 A1* | 6/2009 | Mizutani et al. | 398/66 |
| 2010/0209113 A1* | 8/2010 | Nagaki et al. | 398/140 |
| 2010/0221017 A1* | 9/2010 | Ghiasi | 398/149 |
| 2012/0063774 A1* | 3/2012 | Niibe et al. | 398/34 |
| 2012/0099867 A1* | 4/2012 | Hotta et al. | 398/81 |
| 2012/0224846 A1* | 9/2012 | Swanson et al. | 398/13 |

* cited by examiner

STATUS NOTIFICATION FRAME

| CPU STATUS (NORMAL / IMPLEMENTING SWUG / CPU ABNORMAL) |
|---|
| DISPERSION COMPENSATION AMOUNT SETTING VALUE |
| FEC VALUE |

FIG. 3B

COMPENSATION AMOUNT CONTROL FRAME

| DISPERSION COMPENSATION AMOUNT CONTROL VALUE |
|---|

WDM OPTICAL TRANSMISSION SYSTEM AND WAVELENGTH DISPERSION COMPENSATION METHOD

CROSS-REFERENCE TO RELATED APPLICATION(S)

This application is based upon and claims the benefit of priority of the prior Japanese Patent Application No. 2011-107066, filed on May 12, 2011, the entire contents of which are incorporated herein by reference.

FIELD

The embodiment discussed herein is related to a wavelength dispersion compensation technique in an optical transmission system using Wavelength Division Multiplexing (WDM).

BACKGROUND

Signal waveform deterioration occurs when wavelength dispersion compensation of optical signals is insufficient in a high density WDM optical transmission system having a density of 10 gigabytes or more per second accompanying huge increases in communication capabilities. As a result, properly receiving such optical signals is becoming more difficult. Wavelength dispersion is the phenomenon of the spread of optical signal pulse widths depending upon the optical propagation characteristics and the shape and the like of optical fiber when transmitting optical signals having multiple wavelength bands over a long distance in one optical fiber. To reduce the deterioration of signal waveforms due to this wavelength dispersion, it is desirable to accurately conduct wavelength dispersion compensation in all the wavelength bands of the WDM light at the receiving side of the WDM optical transmission device.

For example, wavelength dispersion compensation is conventionally conducted using Dispersion Compensating Fiber (DCF) in WDM optical transmission systems of 10 gigabytes or more per second. DCF is generally used as a dispersion compensation device having fixed wavelength dispersion values. However, the wavelength dispersion of optical signals varies according to the types and lengths of the optical fiber used in the transmission lines, and according to temperature or other environmental changes. As a result, recently, methods to control dispersion compensation amounts according to environmental changes by equipping optical transmission devices with variable dispersion compensators that can precisely adjust wavelength dispersion values, have become mainstream in wavelength dispersion compensation.

For example, Japanese Laid-open Patent Publication No. 2010-141683 discloses a technique that not only reduces the waveform deterioration due to wavelength dispersion, but also reduces the effects of waveform deterioration due to external factors besides wavelength dispersion such as optical fiber deformation and the like, by measuring round-trip propagation times between receiving and transmitting side devices to derive a reference dispersion compensation value ahead of time. The reference dispersion compensation value is then used in the control of a variable dispersion compensator. Moreover, Japanese Laid-open Patent Publication No. 2008-236480 discloses a technique that includes temporarily accumulating information relating to current wavelength dispersion compensation conditions in a memory, comparing past conditions outputted from the memory with the current conditions, and then controlling dispersion amounts of a dispersion compensation device according to the results of the comparison. Furthermore, Japanese Laid-open Patent Publication No. 2007-259281 discloses a technique to optimize dispersion amounts of a variable dispersion compensator to minimize bit error correction counts measured on the receiving side.

SUMMARY

According to an aspect of the invention, a WDM optical transmission system including a plurality of optical transmission devices, each of the optical transmission devices includes a compensator that compensates a wavelength dispersion of an optical signal which has a variable wavelength dispersion value; a detection circuit that detects a reception characteristic of the optical signal compensated by the compensator; a first memory that stores a first control program that controls a dispersion compensation amount of the compensator in a host device according to the reception characteristic; a processor to execute the first control program; a notification frame transmission circuit that generates a notification frame that includes control information indicating a setting value of the dispersion compensation amount and a detection result of the detection circuit corresponding to the setting value, and that transmits the notification frame to another optical transmission device; a second memory that stores control information included in the notification frame transmitted from the another optical transmission device; a third memory that stores a second control program that calculates a control value of the compensator in the another optical transmission device using the control information stored in the second memory; and a control frame transmission circuit that generates a control frame that includes the control value, and that transmits the control frame to the another optical transmission device, wherein the processor executes the second control program when a problem occurs in a dispersion compensation control of the another optical transmission device, and controls the dispersion compensation amount of the compensator in the host device according to the control value included in the control frame transmitted from the another optical transmission device when a problem occurs in the dispersion compensation control of the host device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

The embodiments of the present disclosure will be explained hereinbelow with reference to the attached drawings.

Figure 1:
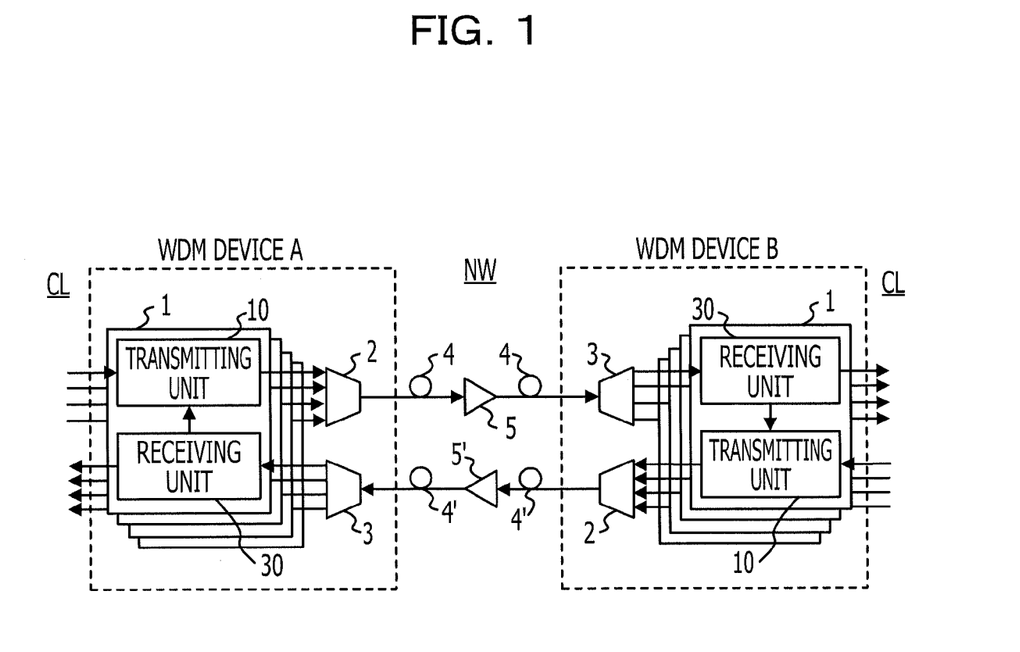
FIG. 1 is a block diagram of an overall configuration according to an embodiment of the WDM optical transmission system.

FIG. 1 is a block diagram of an overall configuration according to a first embodiment of a WDM optical transmission system. The WDM optical transmission system includes a pair of WDM devices A and B coupled to and opposing each other through WDM transmission lines 4 and 4' transmitting WDM light in opposite directions. Optical repeaters 5 and 5' that amplify transmitted WDM light are respectively arranged on the WDM transmission lines 4 and 4'. However, the optical repeaters 5 and 5' may be appropriately provided or omitted according to transmission characteristics and distances and the like of the WDM transmission lines 4 and 4'.

The WDM devices A and B each include a plurality of optical transmission devices 1 that correspond to mutually different wavelengths, an optical multiplexer 2, and an optical demultiplexer 3. The optical transmission devices 1 each include a transmitting unit 10 and a receiving unit 30.

The transmitting units 10 match and map optical signals received from a client (CL) side to structural frames that are transmittable to a WDM network (NW) side, and output the generated optical signals to the optical multiplexer 2. The optical multiplexer 2 multiplexes the optical signals of each wavelength outputted by the transmitting units 10 of the optical transmission devices 1 and transmits the multiplexed signals to the transmission line 4 (or 4'). The optical demultiplexer 3 demultiplexes the WDM light transmitted on the WDM transmission line 4' (or 4) into optical signals of each wavelength and provides the demultiplexed optical signals to the receiving units 30 of the optical transmission devices 1. After the optical signals have been subject to wavelength dispersion compensation by the optical demultiplexer 3, the receiving units 30 demap the optical signals and output the generated signals to the client side.

Figure 2:
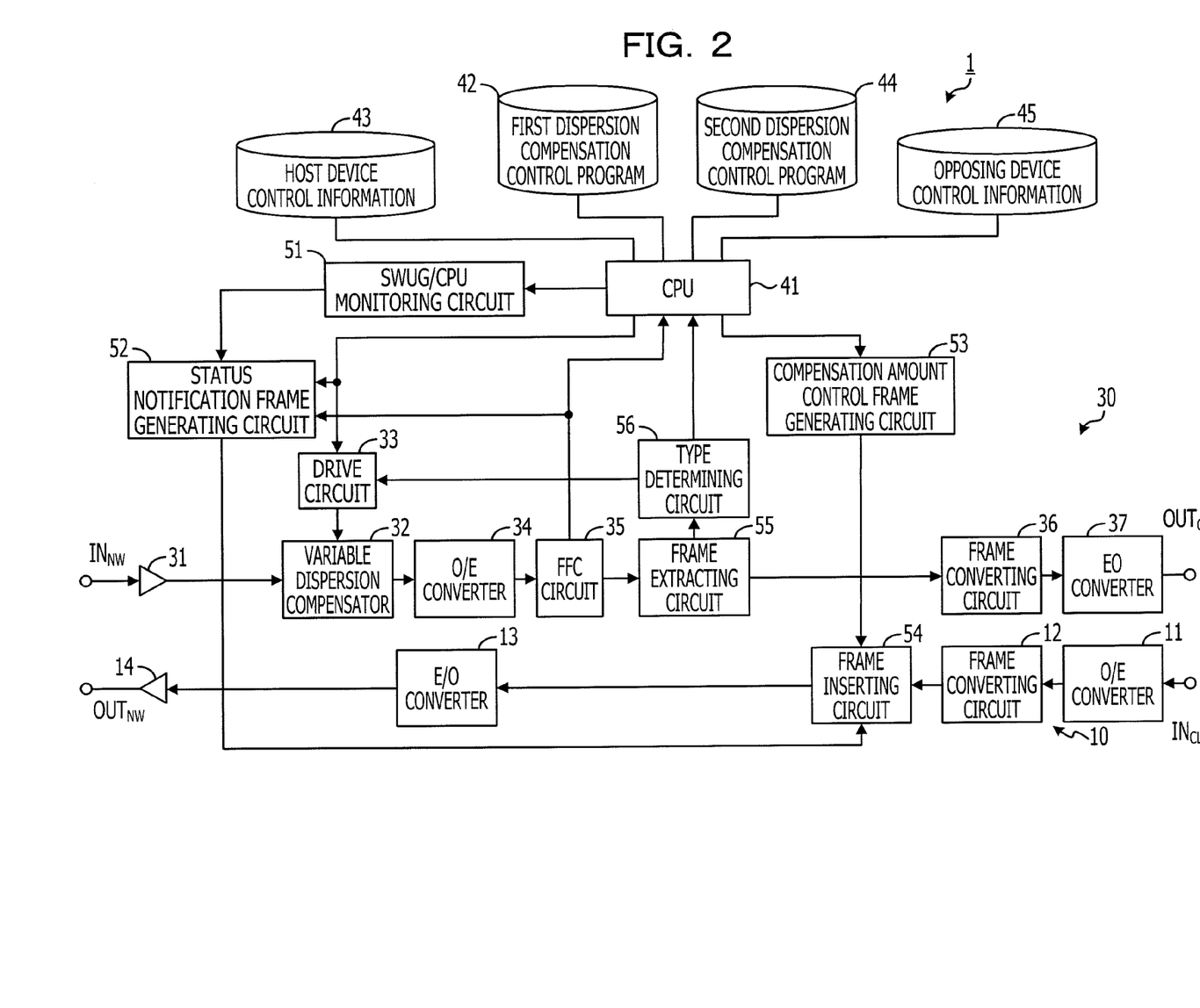
FIG. 2 is a block diagram of a detailed configuration of an optical transmission device according to the above embodiment.

FIG. 2 is a block diagram of a detailed configuration of the optical transmission device 1 described above.

In FIG. 2, the optical transmission device 1 includes an O/E converter 11 coupled to an optical input port $IN_{CL}$ to which is provided optical signals transmitted from the client side (bottom right side of FIG. 2). The O/E converter 11 converts the optical signals from the client side to electrical signals and outputs the electrical signals to a frame converting circuit 12.

The frame converting circuit 12 matches and maps the electrical signals transmitted from the O/E converter 11 to a frame structure such as an Optical Transport Network (OTN) and the like. After the signals have been framed, the frame signals are added to Forward Error Correction (FEC) codes. The electrical signals processed by the frame converting circuit 12 are transmitted via a frame inserting circuit 54 described below to an E/O converter 13.

The E/O converter 13 converts the electrical signals that pass through the frame inserting circuit 54 into narrow bandwidth wavelength optical signals and outputs the optical signals to an optical post-amp 14. The optical post-amp 14 amplifies the optical signals received from the E/O converter 13 to a desired power and outputs the amplified light to an optical output port $OUT_{NW}$ on the WDM network side (bottom left side of FIG. 2). The optical output port $OUT_{NW}$ is coupled to the optical multiplexer 2 illustrated in FIG. 1.

The optical transmission device 1 includes an optical input port $IN_{NW}$ on the WDM network side coupled to an optical pre-amp 31. The optical input port $IN_{NW}$ is provided with optical signals of a single wavelength that are obtained from the WDM light transmitted from the WDM network side and demultiplexed by the optical demultiplexer 3 (see FIG. 1). The optical pre-amp 31 amplifies the optical signals from the optical input port $IN_{NW}$ to a desired power and outputs the amplified signals to a variable dispersion compensator 32.

The variable dispersion compensator 32 allows wavelength dispersion values to be changed across a desired range. The wavelength dispersion values are set according to drive signals outputted by a drive circuit 33. The variable dispersion compensator 32 conducts wavelength dispersion compensation of the optical signals outputted by the optical pre-amp 31 and outputs the dispersion compensated optical signals to an O/E converter 34.

The O/E converter 34 converts the optical signals received from the variable dispersion compensator 32 to electrical signals and outputs the electrical signals to an FEC circuit 35. The FEC circuit 35 conducts processing to correct bit errors of the signals outputted from the O/E converter 34 and then outputs the corrected signals to a frame converting circuit 36 via a frame extracting circuit 55 to be explained below. The FEC circuit 35 transmits bit error correction counts (hereinbelow referred to as an "FEC value") to a CPU 41 and a status notification frame generating circuit 52 to be explained below.

The frame converting circuit 36 demaps the signals outputted from the FEC circuit 35 and outputs the demapped signals to an E/O converter 37. The E/O converter 37 converts the signals outputted by the frame converting circuit 36 to light and transmits the light signals to the client side through an output port $OUT_{CL}$.

The optical transmission device 1 further includes: the central processing unit (CPU) 41 as a control structure to optimize dispersion compensation amounts in the variable dispersion compensator 32 according to reception characteristics of the optical signals received from the WDM network side, in other words the bit error correction counts; a memory 42 (a first memory) that stores a first dispersion compensation control program for a host device; a memory 43 (a fourth memory) that stores control information for the host device; a memory 44 (a third memory) that stores a second dispersion compensation control program for an opposing device; a memory 45 (a second memory) that stores control information for the opposing device; a SWUG/CPU monitoring circuit 51; the status notification frame generating circuit 52; a compensation amount control frame generating circuit 53; the frame inserting circuit 54; the frame extracting circuit 55; and a type determining circuit 56.

The CPU 41 is an example of a processor. The CPU 41 executes the first dispersion compensation control program stored in the memory 42 to optimize the wavelength dispersion compensation conducted in the host device, namely, to maintain the amount of dispersion compensation in the variable dispersion compensator 32 included in the same optical transmission device 1 at an optimal state. The CPU 41 executes the second dispersion compensation control program stored in the memory 44 to remotely optimize the wavelength dispersion compensation conducted in the opposing device during a period when SWUG is being implemented in the device opposing the host device on the WDM network, or when an abnormality occurs in the CPU 41. The CPU 41 includes a function to control constituent elements in the host device according to firmware in addition to controlling the optimization of the wavelength dispersion compensation.

In the system configuration illustrated in FIG. 1 for example, the abovementioned opposing device corresponds to an optical transmission device 1 handling a single wavelength λ in the WDM device B coupled via the WDM network to the host device, where the host device is the optical transmission device 1 that handles the single wavelength λ in the WDM device A. Alternatively for example, the abovementioned opposing device corresponds to an optical transmission device 1 handling the single wavelength λ' in the WDM device A coupled via the WDM network to the host device, where the host device is the optical transmission device 1 that handles the single wavelength λ' in the WDM device B.

The first dispersion compensation control program stored in the memory 42 defines a control algorithm that optimizes the dispersion compensation amount in the variable dispersion compensator 32 in the host device based on reception characteristics of the optical signals received in the host device from the WDM network side. As explained in detail below, feedback control of the variable dispersion compensator 32 is conducted so that FEC values are minimized using the FEC values transmitted from the FEC circuit 35 to the CPU 41 in the host device. The feedback control is conducted by the execution of the first dispersion compensation control program by the CPU 41. The wavelength dispersion values set in the variable dispersion compensator 32 in the host device in the dispersion compensation control process and the FEC values corresponding to the wavelength dispersion values are stored in the memory 43 as host device control information and the control information is also transferred to the status notification frame generating circuit 52.

The second dispersion compensation control program stored in the memory 44 defines a dispersion compensation control algorithm that is basically similar to the abovementioned first dispersion compensation control program. However, the second dispersion compensation control program calculates an optical wavelength dispersion compensation amount using control information for the opposing device stored in the memory 45 inside the host device instead of using the FEC values detected by the FEC circuit 35 in the host device. The control information for the opposing device stored in the memory 45 represents wavelength dispersion values and FEC values of the opposing device that are transferred from the opposing device to the host device and stored while SWUG is not being implemented in the opposing device and while the CPU 41 is operating normally. The above-mentioned second dispersion compensation control program is executed by the CPU 41 in the host device and the dispersion compensation amount values calculated by the CPU 41 are transferred to the compensation amount control frame generating circuit 53 when SWUG is being implemented or when an abnormality occurs in the CPU 41 in the opposing device.

The SWUG/CPU monitoring circuit 51 monitors whether or not a firmware upgrade (SWUG) conducted by the CPU 41 in the host device is being implemented, and also monitors whether or not a high load condition or an abnormality such as a failure and the like has occurred in the CPU 41 in the host device. The SWUG/CPU monitoring circuit 51 transfers results of the monitoring to the status notification frame generating circuit 52.

Figure 3A:
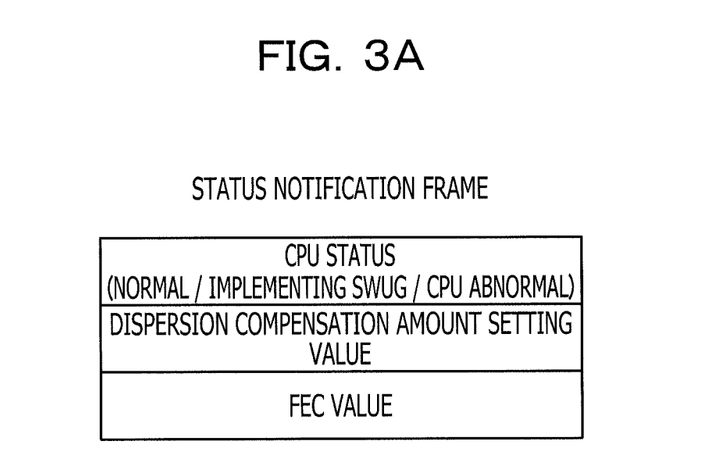
FIG. 3A illustrates a status notification frame and FIG. 3B illustrates a compensation amount control frame according to the above embodiment.

The status notification frame generating circuit 52 generates a status notification frame to report the wavelength dispersion compensation status of the host device to the opposing device using the FEC values transferred by the FEC circuit 35 in the host device, dispersion compensation amount setting values of the variable dispersion compensator 32 calculated by the CPU 41 based on the FEC values and transferred by the drive circuit 33, and the monitoring results transferred by the SWUG/CPU monitoring circuit 51. The status notification frame generating circuit 52 outputs the status notification frame to the frame inserting circuit 54. As illustrated in FIG. 3A for example, the status notification frame includes respective regions storing data that indicates a CPU status, the dispersion compensation amount setting value, and the FEC value. The CPU status is selectively set as "normal," which indicates a status in which SWUG is not being implemented and the CPU 41 is operating normally, "implementing SWUG," which indicates a status in which SWUG is implemented, and "CPU abnormal," which indicates a status in which an abnormality has occurred in the CPU 41 due to a high load or a failure and the like.

Figure 3B:
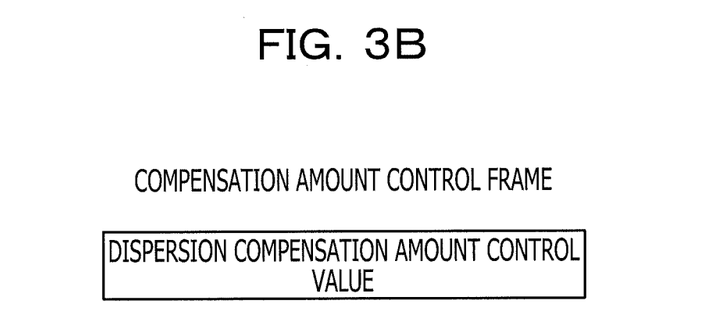

The compensation amount control frame generating circuit 53 generates a compensation amount control frame to remotely control the variable dispersion compensator 32 in the opposing device by using the dispersion compensation amount control value calculated by the execution of the second dispersion compensation control program by the CPU 41 in the host device. The compensation amount control frame generating circuit 53 outputs the compensation amount control frame to the frame inserting circuit 54. As illustrated in FIG. 3B for example, the compensation amount control frame includes a region in which is stored data that indicates the dispersion compensation amount control value.

The frame inserting circuit 54 is provided on the signal line that connects the frame converting circuit 12 and the E/O converter 13 of the transmitting unit 10 side. The frame inserting circuit 54 inserts the status notification frame generated by the status notification frame generating circuit 52 and the compensation amount control frame generated by the compensation amount control frame generating circuit 53 into a certain region (for example, an undefined region in the overhead and the like) of the electrical signals framed by the frame converting circuit 12.

The frame extracting circuit 55 is provided on the signal line connecting the FEC circuit 35 to the frame converting circuit 36 on the receiving unit 30 side. The frame extracting circuit 55 extracts the status notification frame and the compensation amount control frame included in the certain region of the electrical signals processed by the FEC circuit 35, and outputs the extracted frames to the type determining circuit 56.

The type determining circuit 56 determines whether the frames extracted by the frame extracting circuit 55 are status notification frames or compensation amount control frames. If the result of the determination indicates that an extracted frame is the status notification frame, the type determining circuit 56 transfers the status notification frame to the CPU 41 in the host device. The CPU 41 that receives the status notification frame from the type determining circuit 56 determines whether or not to execute the second dispersion compensation control program according to the status of the CPU of the opposing device indicated by the status notification frame, and stores the setting value of the dispersion compensation amount and the FEC value indicated by the status notification frame in the memory 45 for the opposing device. Conversely, if the result of the determination indicates that the extracted frame is the compensation amount control frame, the type determining circuit 56 transfers the compensation amount control frame to the drive circuit 33 in the host device. The drive circuit 33 that receives the compensation amount control frame from the type determining circuit 56 sets the dispersion compensation amount for the variable dispersion compensator 32 according to the dispersion compensation amount control value indicated in the compensation amount control frame.

The following is an explanation of operations in the WDM optical transmission system of the present embodiment.

In the above configuration of the WDM optical transmission system, the dispersion compensation amount of the variable dispersion compensator 32 in the host device is initially set at the time of the system start-up by the execution of the first dispersion compensation control program by the CPU 41 according to the firmware for the optical transmission devices 1 in the WDM devices A and B.

Figure 4:
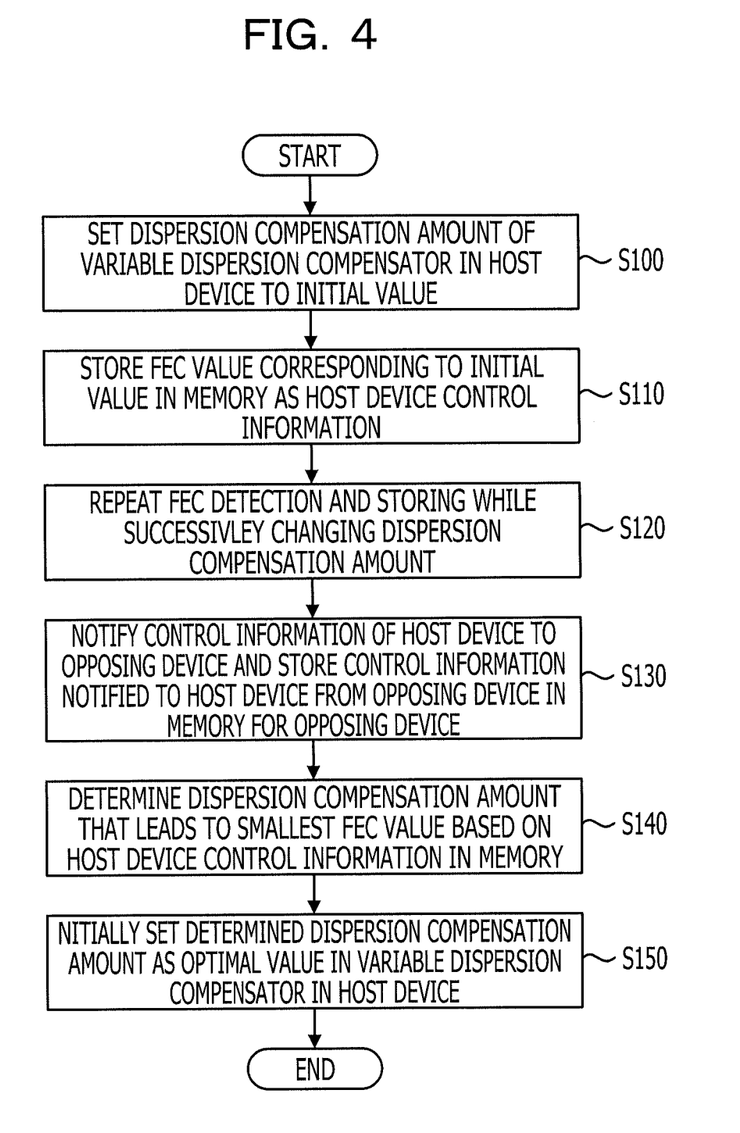
FIG. 4 is a flow chart illustrating an example of a dispersion compensation control algorithm during initial setting according to the above embodiment.

An example of a dispersion compensation control algorithm executed by the optical transmission devices 1 during initial setting will be described in detail with reference to the flow chart illustrated in FIG. 4. Firstly, in each optical transmission device 1, the CPU 41 sends an instruction to the drive circuit 33 to set a previously determined initial value (for example, −1200 ps/nm) for the dispersion compensation amount of the variable dispersion compensator 32 in the host device. A signal to drive the variable dispersion compensator 32 with the above initial value is generated in the drive circuit 33 that receives the instruction from the CPU 41. The drive circuit 33 provides the drive signal to the variable dispersion compensator 32. As a result, the dispersion compensation amount of the variable dispersion compensator 32 is set to the initial value (S100 in FIG. 4).

A test light is transmitted from the transmitting unit 10 of the opposing device to the WDM network. The test light transmitted in the WDM network is received by the optical pre-amp 31 in the host device. The test light is amplified by the optical pre-amp 31 and provided to the variable dispersion compensator 32. Wavelength dispersion compensation of the test light is conducted according to the dispersion compensation amount initial value set in the variable dispersion compensator 32. The test light dispersion compensated by the variable dispersion compensator 32 is converted to electrical signals by the O/E converter 34, and bit error correction processing is conducted by the FEC circuit 35. The FEC value detected by the FEC circuit 35 is notified to the CPU 41 and the status notification frame generating circuit 52. The CPU 41 receives the notified FEC value and stores the FEC value and the current initial setting of the variable dispersion compensator 32 in the memory 43 as host device control information (S110).

Figure 5:
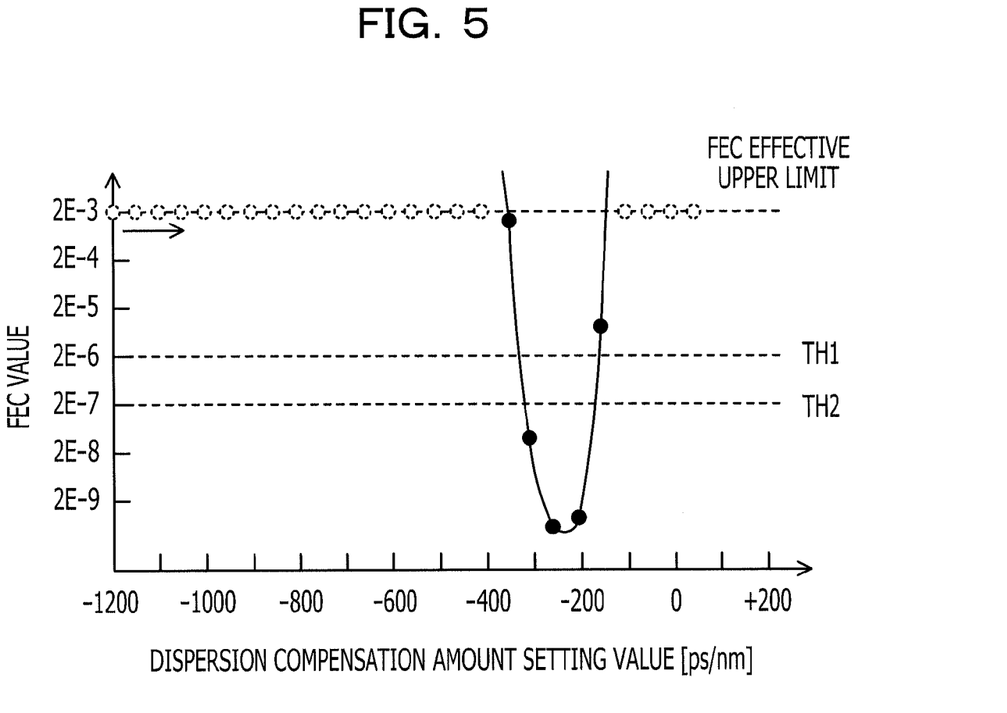
FIG. 5 illustrates a relationship between FEC values and dispersion compensation amount setting values stored in a memory during the initial setting.

The CPU 41 then conducts processing similar to the above S110 while sequentially changing the wavelength dispersion amount in the variable dispersion compensator 32 of the host device from the initial value by fixed dispersion widths (for example, +50 ps/nm). The CPU 41 repeats the detection of the FEC value of the test light signals received from the opposing device and the storing of the values in the memory 43 (S120). As a result, a relationship between the FEC values and the dispersion compensation amount setting values is stored in the memory 43 as illustrated, for example, in FIG. 5.

The repeated processing described above in S120 is implemented at least until dispersion compensation amount setting values that are lower than a predetermined first threshold TH1 (for example, $2 \times 10^{-6}$) of the FEC value appear two times in succession, and the corresponding FEC value of the latter of the two setting values is larger than the corresponding FEC value of the former of the two setting values. In other words, the repeated processing is implemented until the point where the change of the FEC value between the two setting values switches from a decrease to an increase.

While the above repeated processing is being implemented, the status notification frame generating circuit 52 of the host device successively generates status notification frames that indicate monitoring results of the CPU 41 conducted by the SWUG/CPU monitoring circuit 51, the current dispersion compensation amount setting values of the variable dispersion compensator 32, and the FEC values detected by the FEC circuit 35. The generated status notification frames are provided to the frame inserting circuit 54. The status notification frames received from the status notification frame generating circuit 52 are inserted by the frame inserting circuit 54 into a desired region of the test signals transmitted to the opposing device from the host device. As a result, a test light that includes the status notification frames is transmitted from the host device to the opposing device through the WDM network. The status notification frames are extracted by the frame extracting circuit 55 in the opposing device that receives the test light that includes the status notification frames. If the CPU status indicated in the status notification frames is determined by the type determining circuit 56 to be "normal," the dispersion compensation amount setting values and the FEC values indicated by the status notification frames are stored in the memory 45 as opposing device control information. Specifically, each optical transmission device 1 sends the control information to the opposing device while implementing the initial setting of the variable dispersion compensator 32 in the host device, and stores the initial setting control information implemented by the opposing device in the memory 45 in the host device (S130 in FIG. 4).

The CPU 41 determines the setting value of the dispersion compensation amount derived from the smallest FEC value based on the relationships between the FEC values and the dispersion compensation amount setting values stored in the memory 43 (S140). The CPU 41 then initially sets the determined setting value as the dispersion compensation amount optimal value in the variable dispersion compensator 32 of the host device (S150). As a result, the initial setting of the variable dispersion compensator 32 in the host device is completed and the corresponding optical transmission device 1 can begin operating.

Next, an example of a dispersion compensation control algorithm executed during operation will be described in detail with reference to the flow chart illustrated in FIG. 6.

Figure 6:
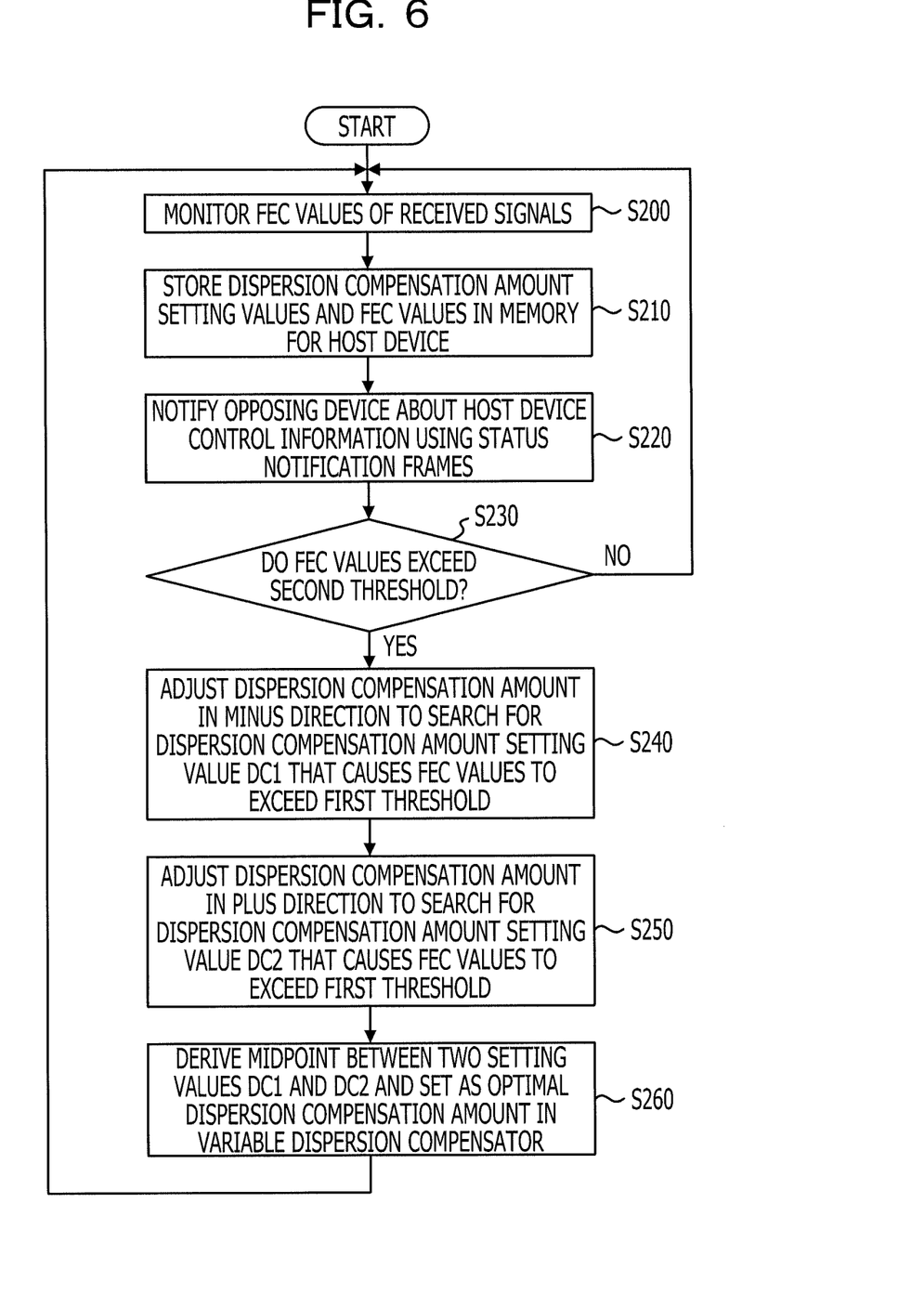
FIG. 6 is a flow chart illustrating an example of a dispersion compensation control algorithm during operation according to the above embodiment.

During operation after the initial setting is completed, the CPU 41 of each optical transmission device 1 monitors at certain intervals the received signal FEC values detected by the FEC circuit 35 in the host device (S200 in FIG. 6).

While the above monitoring of the FEC values is being conducted, the current dispersion compensation amount setting values of the variable dispersion compensator 32 and the corresponding FEC values are stored as host device control information in the memory 43 (S210).

The status notification frame generating circuit 52 successively generates status notification frames that indicate the monitoring results of the CPU 41 conducted by the SWUG/CPU monitoring circuit 51, the current dispersion compensation amount setting values of the variable dispersion compensator 32, and the FEC values detected by the FEC circuit 35. The status notification frames are inserted by the frame inserting circuit 54 into a desired region of signals transmitted to the opposing device from the host device. As a result, optical signals that include the status notification frames are transmitted from the host device to the opposing device through the WDM network (S220).

The CPU 41 then determines whether or not the monitored FEC values exceed a second threshold TH2 (for example, $2\times10^{-7}$) that is lower than the abovementioned first threshold TH1 (S230). If an FEC value equals or falls below the second threshold TH2, the CPU 41 maintains the dispersion compensation amount of the variable dispersion compensator 32 at the current setting value and continues to monitor the FEC values.

Conversely, if the FEC values exceed the second threshold TH2, the CPU 41 adjusts the dispersion compensation amount of the variable dispersion compensator 32 by a fixed dispersion width (for example, −50 ps/nm) in the minus direction from the initial setting value, and searches for a dispersion compensation amount setting value DC1 that causes the FEC values to exceed the first threshold TH1 (S240).

The CPU 41 adjusts the dispersion compensation amount of the variable dispersion compensator 32 by a fixed dispersion width (for example, +50 ps/nm) in the plus direction from the initial setting value, and searches for a dispersion compensation amount setting value DC2 that causes the FEC values to exceed the first threshold TH1 (S250). The dispersion compensation amount setting values and the corresponding FEC values from the abovementioned minus direction and plus direction searching processes are also stored in the memory 43 as host device control information in the same way as in the above S210 and S220, and are notified to the opposing device using the status notification frames.

When the above dispersion compensation amount setting values DC1 and DC2 are identified, the CPU 41 derives a midpoint between the setting values DC1 and DC2 ((DC1+DC2)/2), and sets the derived midpoint as the optimal value of the dispersion compensation amount in the variable dispersion compensator 32 (S260). By repeatedly conducting the above series of procedures from S200 to S260 in the optical transmission devices 1 while operating, the dispersion compensation amounts at the receiving side of each optical transmission device 1 are optimized in response to fluctuations even when wavelength dispersion of the optical signals transmitted from the WDM network side fluctuates due to temperature and other environmental changes.

The abovementioned dispersion compensation control (optimization of the dispersion compensation amount in the variable dispersion compensator 32 of the host device) conducted by the optical transmission devices 1 while operating and during the initial setting is difficult to conduct properly when conducting the series of procedures independently in the host device according to the dispersion compensation control algorithms when SWUG is being implemented in the host device or when an abnormality occurs in the CPU 41 due to a high load or a failure and the like.

However according to the present embodiment, each optical transmission device 1 shares control information between the host device and the opposing device by notifying the opposing device about the dispersion compensation control information of the host device using the status notification frames when SWUG is not being implemented in the host device and when the CPU 41 is operating normally. When the SWUG is being implemented or a CPU abnormal status occurs in the host device, the second dispersion compensation control program is executed by the CPU 41 in the opposing device instead of the CPU 41 in the host device for which normal operation is difficult, based on the status indicated to the opposing device using the status notification frames. The execution result of the second dispersion compensation control program executed by the opposing device is transmitted to the host device using the compensation amount control frames, and optimization of the variable dispersion compensator 32 in the host device is conducted according to the dispersion compensation amount control value indicated in the compensation amount control frames. Specifically, the variable dispersion compensator 32 of the host device is remotely controlled by the CPU 41 of the opposing device when SWUG is being implemented or when a CPU abnormality occurs in the host device in the optical transmission devices 1.

Figure 7:
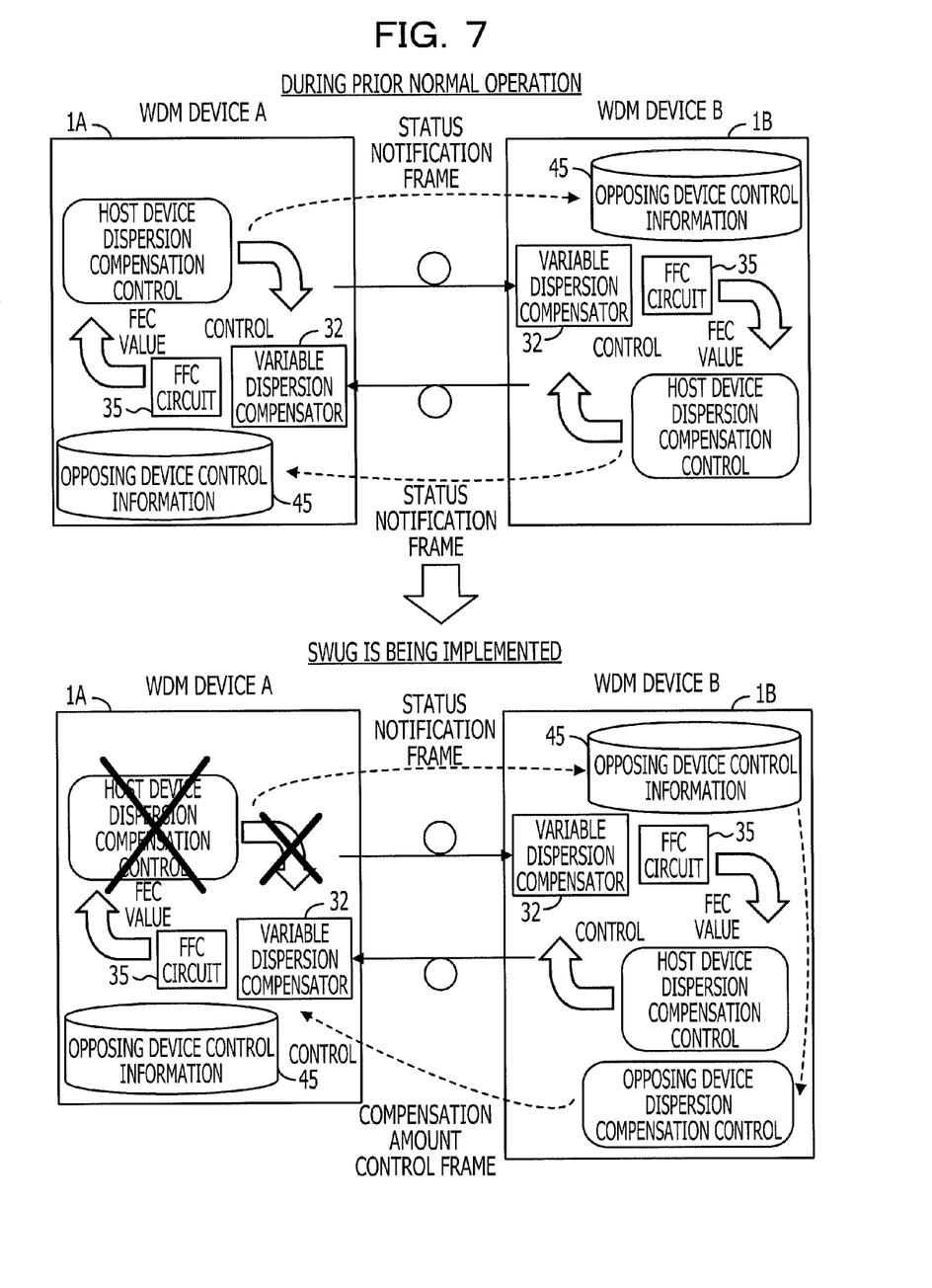
FIG. 7 is a schematic diagram for explaining operations during SWUG according to the above embodiment.

Specifically, as illustrated in the schematic diagram in FIG. 7 for example, a case may be assumed where SWUG is started in the operating optical transmission device 1A and processing according to the firmware is not executed by the CPU 41 in the optical transmission device 1A (bottom of FIG. 7), between the optical transmission device 1A that handles the wavelength λ in the WDM device A, and the optical transmission device 1B that handles the above wavelength λ in the WDM device B. A detailed explanation of operations by the optical transmission devices 1A and 1B in this case will be provided with reference to the flow chart illustrated in FIG. 8. However, the CPU 41 of the optical transmission device 1B is assumed to be operating normally while the SWUG is being implemented in the optical transmission device 1A.

When the SWUG is started in the optical transmission device 1A during prior normal operation (top of FIG. 7), the abovementioned wavelength dispersion compensation control information of the optical transmission device 1A is notified to the optical transmission device 1B using the status notification frames, and the optical transmission device 1A control information is stored in the memory 45 in the optical transmission device 1B.

Figure 8:
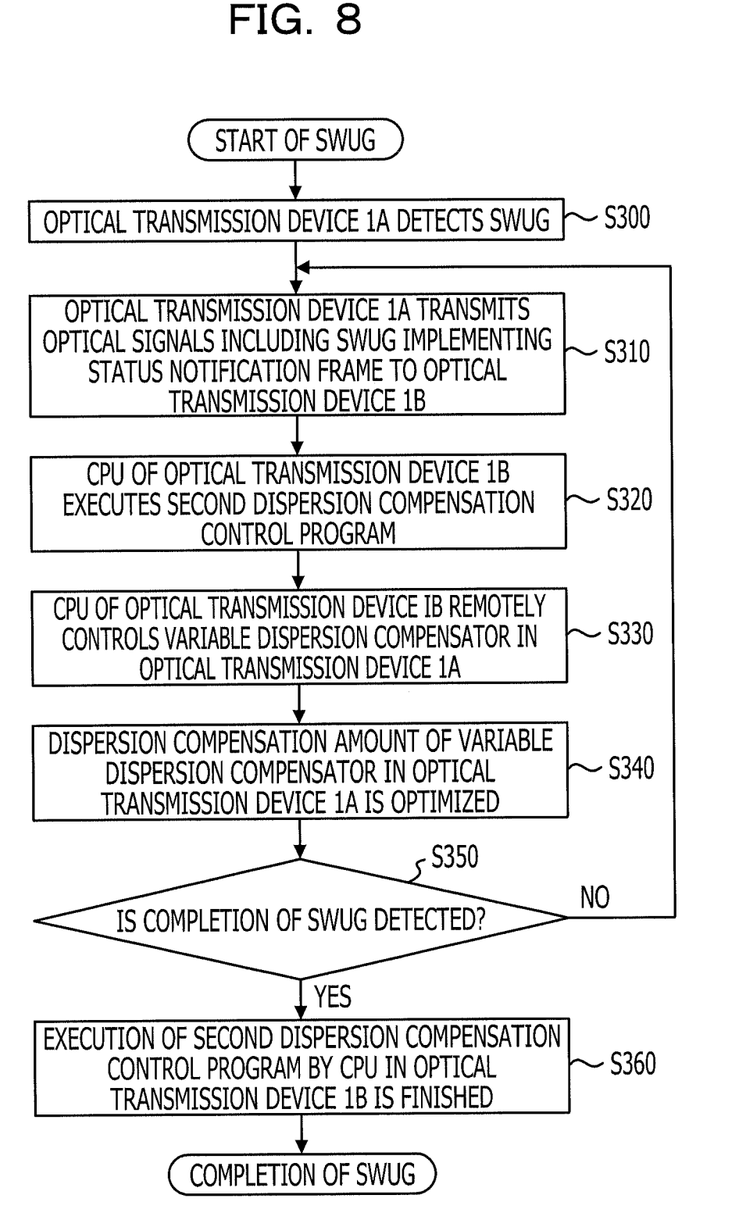
FIG. 8 is a flow chart illustrating processing by optical transmission devices during SWUG according to the above embodiment.

When the SWUG is started in the optical transmission device 1A, the start of the SWUG is detected by the SWUG/CPU monitoring circuit 51 in the optical transmission device 1A and notified to the status notification frame generating circuit 52 (S300 in FIG. 8). The status notification frame generating circuit 52 generates status notification frames in which the item indicating the CPU status is switched from "normal" to "implementing SWUG." The status notification frames are inserted by the frame inserting circuit 54 into a desired region of signals transmitted to the optical transmission device 1B. As a result, optical signals including the status notification frames that indicate that the optical transmission device 1A is implementing SWUG are transmitted from the optical transmission device 1A through the WDM network to the optical transmission device 1B (S310).

In the optical transmission device 1B that receives the optical signals including the above status notification frames, the status notification frames are extracted by the frame extracting circuit 55 and outputted to the type determining circuit 56. The type determining circuit 56 determines that the state of the CPU indicated in the status notification frames received from the frame extracting circuit 55 is "implementing SWUG," and the status notification frames are outputted to the CPU 41. The CPU 41 determines that the optical transmission device 1A is implementing SWUG based on the status notification frames received from the type determining circuit 56, and executes the second dispersion compensation control program (S320).

The series of procedures concerning the above second dispersion compensation control program are substantially the same as the above-mentioned dispersion compensation control algorithm during operation (see FIG. 6). However, the dispersion compensation amount of the variable dispersion compensator 32 in the optical transmission device 1A is remotely controlled by the CPU 41 in the optical transmission device 1B by using the optical transmission device 1A control information stored in the memory 45 instead of using the FEC values of the FEC circuit 35 in the optical transmission device 1B (S330).

To provide a more detailed explanation of the processing for the above S330, since the CPU 41 in the optical transmission device 1B discerns the current dispersion compensation amount setting value and the corresponding FEC value of the optical transmission device 1A from the status notification frames sent from the optical transmission device 1A that is implementing SWUG, the CPU 41 in the optical transmission device 1B determines whether or not the FEC value exceeds the second threshold TH2 (corresponding to S230 in FIG. 6). If the FEC value exceeds the second threshold TH2, the CPU 41 calculates a control value for adjusting the current dispersion compensation amount of the optical transmission device 1A in the minus direction by fixed dispersion widths. The dispersion compensation amount control value is sent to the compensation amount control frame generating circuit 53 and compensation amount control frames that indicate the control value are generated. The status notification frames are inserted by the frame inserting circuit 54 into a desired region of signals transmitted to the optical transmission device 1A. As a result, optical signals including the status notification frames are transmitted from the optical transmission device 1B through the WDM network to the optical transmission device 1A.

In the optical transmission device 1A that receives the optical signals including the above status notification frames, the status notification frames are extracted by the frame extracting circuit 55 and outputted to the type determining circuit 56. The frames outputted by the frame extracting circuit 55 are determined as compensation amount control frames by the type determining circuit 56, and the compensation amount control frames that indicate the dispersion compensation amount control value are transferred to the drive circuit 33. As a result, the dispersion compensation amount of the variable dispersion compensator 32 in the optical transmission device 1A is adjusted in the minus direction from the current setting value so that an FEC value that corresponds to the adjusted setting value is able to be detected by the FEC circuit 35. The dispersion compensation amount setting value and the FEC value after the adjusting in the optical transmission device 1A are transmitted to the optical transmission device 1B using the status notification frames and stored in the memory 45 in the optical transmission device 1B.

By repeating the above processing in the optical transmission devices 1A and 1B, searching for the dispersion compensation amount of the optical transmission device 1A in the minus direction (corresponding to S240 in FIG. 6) and searching for the same in the plus direction (corresponding to S250) may be conducted. The CPU 41 of the optical transmission device 1B uses the control information of the optical transmission device 1A stored in the memory 45 to identify two dispersion compensation amount setting values DC1 and DC2 that cause the FEC value to exceed the first threshold TH1. The CPU 41 then calculates a midpoint between the setting values DC1 and DC2 and establishes the midpoint as the dispersion compensation amount optimal value of the of the optical transmission device 1A.

The dispersion compensation amount optimal value calculated by the CPU 41 of the optical transmission device 1B as described above is transmitted to the optical transmission device 1A using the compensation amount control frames. As a result, the dispersion compensation amount of the variable dispersion compensator 32 in the optical transmission device 1A is set to the optimal value calculated by the optical transmission device 1B (S340 in FIG. 8). The above series of procedures described in S310 to S340 are repeated until the completion of the SWUG is detected by the SWUG/CPU monitoring circuit 51 in the optical transmission device 1A (S350). When the completion of the SWUG is detected, the CPU 41 of the optical transmission device 1B stops executing the second dispersion compensation control program and continues to execute the first dispersion compensation control program (S360).

The detailed example illustrated in FIGS. 7 and 8 above describe control operations when the SWUG is being implemented in the optical transmission device 1A during operation. However, when an abnormality occurs in the CPU 41 in the optical transmission device 1A due to a high load or a failure and the like, optimization of the dispersion compensation amount of the variable dispersion compensator 32 in the optical transmission device 1A is made possible with control operations similar to the above operations while the SWUG is being implemented by changing the item that indicates the status of the CPU from "implementing SWUG" to "CPU abnormal" in the status notification frames.

Moreover, there is a possibility that a CPU abnormality may occur or the SWUG may be implemented in the optical transmission device 1A not only during operation, but also during initial setting while the system is booting up. In this case also, the CPU 41 in the optical transmission device 1B is able to conduct initial setting of the dispersion compensation amount of the variable dispersion compensator 32 in the optical transmission device 1A by using the control information of the optical transmission device 1A stored in the memory 45 to conduct a series of procedures substantially similar to the dispersion compensation control algorithm during the initial setting as described above in FIG. 4.

According to the WDM optical transmission system of the present embodiment as described above, dispersion compensation control information is shared between two opposing optical transmission devices 1 coupled through the WDM network. When a problem occurs in the dispersion compensation control due to a CPU abnormality or the implementation of the SWUG in a host device, the second dispersion compensation control program is executed by the CPU 41 in the opposing device instead of the CPU 41 in the host device such that the variable dispersion compensator 32 in the host device may be remotely controlled by the CPU 41 in the opposing device. In this way, the dispersion compensation amount of the variable dispersion compensator 32 in the host device may be optimized in real time despite fluctuations due to temperature and other environmental changes affecting the wavelength dispersion of the optical signals transmitted from the WDM network side. As a result, desirable line quality may be maintained and service may be continued without the line service being affected during operation even if a problem occurs in the dispersion compensation control of the host device, and thus reliability of the line service may be improved. Moreover, since a configuration is used in which two opposing optical transmission devices complement the other device's dispersion compensation control, a complicated configuration may be avoided and costs may be controlled compared to conventional methods that address CPU abnormalities and the like through the duplication of individual optical transmission devices.

The abovementioned embodiment describes an exemplary configuration in which a compensation status of wavelength dispersion is determined according to FEC values detected by an FEC circuit to optimize the dispersion compensation amount of a variable dispersion compensator. However, indices for determining the compensation status of the wavelength dispersion are not limited to FEC values. Alternatively, for example, a Q value and the like of received signals may be monitored to determine the compensation status of the wavelength dispersion.

Figure 9:
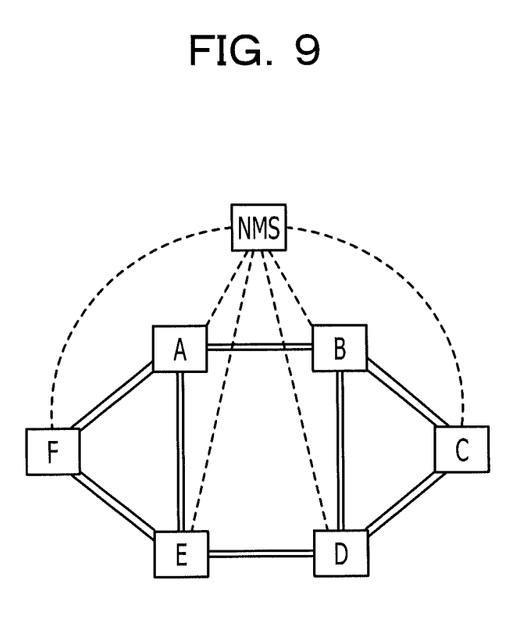
FIG. 9 illustrates an example of another network configuration related to the above embodiment.

Furthermore, a case may be described in which status notification frames and compensation amount control frames are transmitted by using optical signals transmitted and received in both directions between two opposing optical transmission devices. However, as illustrated in FIG. 9 for example, in the case of a network configuration in which WDM devices A to F arranged in optical nodes on a WDM network are integrally managed by a Network Management System (NMS), the transmission of the status notification frames and the compensation amount control frames may be conducted by using management signals transmitted and received between the WDM devices A to F and the NMS. In this case, a complicated network configuration may be flexibly addressed by allowing for the mutual complementing of dispersion compensation control between optical transmission devices each equipped with corresponding wavelengths with two WDM devices arranged on any of the optical nodes on the WDM network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A Wavelength Division Multiplexing (WDM) optical transmission system including a plurality of optical transmission devices, each of the optical transmission devices comprising: a compensator that compensates a wavelength dispersion of an optical signal which has a variable wavelength dispersion value; a detection circuit that detects a reception characteristic of the optical signal compensated by the compensator; a first memory that stores a first control program that controls a dispersion compensation amount of the compensator in a host device according to the reception characteristic; a processor to execute the first control program; a notification frame transmission circuit that generates a notification frame that includes control information indicating a setting value of the dispersion compensation amount and a detection result of the detection circuit corresponding to the setting value, and that transmits the notification frame to another optical transmission device; a second memory that stores control information included in the notification frame transmitted from the another optical transmission device; a third memory that stores a second control program that calculates a control value of the compensator in the another optical transmission device using the control information stored in the second memory; and a control frame transmission circuit that generates a control frame that includes the control value, and that transmits the control frame to the another optical transmission device, wherein the processor: executes the second control program when a problem occurs in a dispersion compensation control of the another optical transmission device, and controls the dispersion compensation amount of the compensator in the host device according to the control value included in the control frame transmitted from the another optical transmission device when a problem occurs in the dispersion compensation control of the host device.

2. The WDM optical transmission system according to claim 1, wherein:
   the status notification frame includes information indicating an operating status of the processor in the host device, and
   the processor determines whether a problem has occurred in the dispersion compensation control of the another optical transmission device based on the status notification frame transmitted from the another optical transmission device.

3. The WDM optical transmission system according to claim 1, wherein:
   the plurality of optical transmission devices include a pair of optical transmission devices opposing and coupled to each other through a pair of WDM transmission lines in which optical signals are transmitted in mutually opposing directions, and
   the notification frame transmission circuit and the control frame transmission circuit respectively transmit the status notification frame and the control frame to the another optical transmission device opposing the host device by using the optical signals transmitted on the WDM transmission line from the host device.

4. The WDM optical transmission system according to claim 1, further comprising:
   a network management device that conducts integrated management of the optical transmission devices, wherein
   the notification frame transmission circuit and the control frame transmission circuit respectively transmit the status notification frame and the control frame to another optical transmission device through the network management device by using management signals transmitted to the network management device from the host device.

5. The WDM optical transmission system according to claim 1, wherein:
   the processor executes the second control program when a software upgrade is implemented in the another optical transmission device, and controls the dispersion compensation amount of the compensator in the host device according to a control value indicated in the control frame transmitted from the another optical transmission device when a software upgrade is being implemented in the host device.

6. The WDM optical transmission system according to claim 1, wherein:
   the processor executes the second control program when an abnormality of the processor in the another optical transmission device occurs, and controls the dispersion compensation amount of the compensator in the host device according to a control value indicated in the control frame transmitted from the another optical transmission device when an abnormality occurs in the processor's own operation.

7. The WDM optical transmission system according to claim 1, wherein:
   the detection circuit detects a bit error correction count of an optical signal whose dispersion is compensated by the compensator.

8. The WDM optical transmission system according to claim 1, wherein:

the detection circuit detects a Q signal of an optical signal whose dispersion is compensated by the compensator.

9. The WDM optical transmission system according to claim 1, wherein:

the plurality of optical transmission devices each include a fourth memory that stores control information that indicates the dispersion compensation amount setting value of the compensator in the host device and indicates a detection result by the detection circuit corresponding to the setting value.

10. A wavelength dispersion compensation method in a Wavelength Division Multiplexing (WDM) optical transmission system that includes a first optical transmission device and a second optical transmission device, wherein: the first optical transmission device: uses a compensator to compensate a wavelength dispersion of an optical signal which has variable wavelength dispersion value; detects a reception characteristic of the dispersion-compensated optical signal; conducts a first control program that controls a dispersion compensation amount of the compensator in a host device using a processor based on the detected reception characteristic, and generates a status notification frame that includes control information indicating a setting value of the dispersion compensation amount of the compensator in the host device and indicating the reception characteristic corresponding to the setting value; transmits the status notification frame to the second optical transmission device; and wherein the second optical transmission device: stores control information included in the status notification frame transmitted by the first optical transmission device in a memory and, when a problem in dispersion compensation control occurs in the first optical transmission device, uses the control information stored in the memory, executes a second control program to calculate a dispersion compensation amount control value of the compensator in the first optical transmission device, and generates a control frame that includes the dispersion compensation amount control value calculated according to the second control program; and transmits the control frame to the first optical transmission device, wherein the first optical transmission device controls the dispersion compensation amount of the compensator in the host device according to the control value included in the control frame transmitted from the second optical transmission device when a problem occurs in the dispersion compensation control in the host device.

11. The wavelength dispersion compensation method according to claim 10, wherein the first optical transmission device transmits to the second optical transmission device the status notification frame including information that indicates an operating status of the processor in the host device, and the second optical transmission device determines whether or not a problem has occurred in the dispersion compensation control in the first optical transmission device according to the status notification frame transmitted from the first optical transmission device.

12. The wavelength dispersion compensation method according to claim 10, wherein the first and second optical transmission devices oppose each other and are coupled to each other through a pair of WDM transmission lines in which optical signals are transmitted in mutually opposing directions, and the first optical transmission device uses optical signals transmitted through the WDM transmission lines from the host device to transmit to the second optical transmission device the status notification frame, and the second optical transmission device uses optical signals transmitted through the WDM transmission lines from the host device to transmit to the first optical transmission device the status notification frame.

13. The wavelength dispersion compensation method according to claim 10, wherein the WDM optical transmission system includes a network management device that conducts integrated management of a plurality of optical transmission devices, wherein the first optical transmission device uses management signals transmitted to the network management device from the host device to transmit to the second optical transmission device the status notification frame through the network management device, and the second optical transmission device uses management signals transmitted to the network management device from the host device to transmit to the first optical transmission device the status notification frame through the network management device.

\* \* \* \* \*